UNITED STATES PATENT OFFICE.

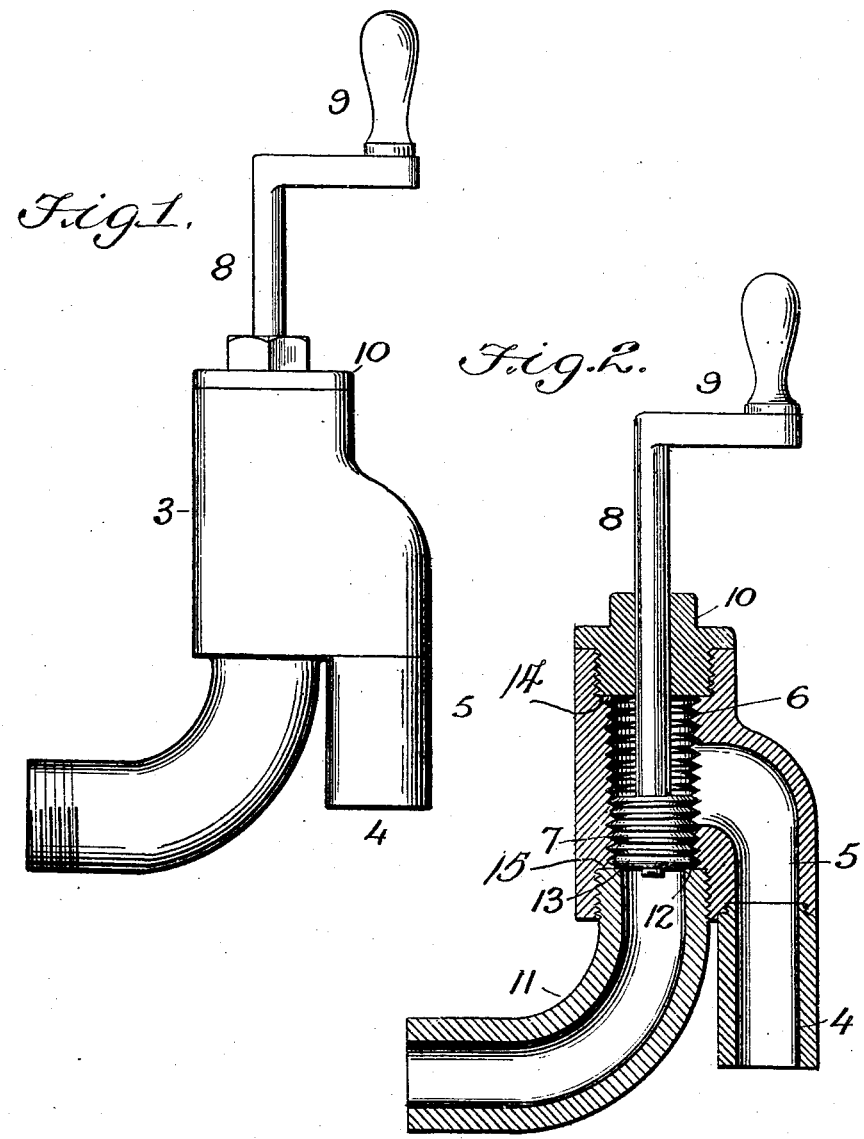

OWEN WARNOCK, OF BROOKLYN, NEW YORK.

FAUCET.

No. 917,689.　　　　Specification of Letters Patent.　　　Patented April 6, 1909.

Application filed April 17, 1906. Serial No. 312,163.

*To all whom it may concern:*

Be it known that I, OWEN WARNOCK, a citizen of the United States, residing at Brooklyn, in the county of Kings and State of New York, have invented new and useful Improvements in Faucets, of which the following is a specification.

This invention relates to faucets and more particularly to that class so designed that water or other liquid can readily drain therefrom when the service pipe is cut out of use so that there is no liability of freezing when the temperature reaches the freezing point.

The invention has for its object to provide a faucet of this character which is simple and durable in construction, comparatively inexpensive to manufacture, and so designed with a view to compactly arranging the parts.

The invention comprises the various novel features of construction and arrangement of parts which will be more fully described hereinafter and set forth with particularity in the appended claim.

In the accompanying drawing, which illustrates one embodiment of the invention, Figure 1 is a side elevation of the faucet. Fig. 2 is a central vertical section thereof.

Similar reference characters are employed to designate corresponding parts throughout the several views.

Referring to the drawing, 3 designates the body of the faucet which is preferably a brass or other casting formed with a main valve chamber 6 of uniform diameter threaded throughout its length and having enlarged chambers at the top and bottom ends and axially in line with the main chamber. These enlarged chambers are of the same diameter and are threaded for receiving, respectively, a cap nut and a coupling or elbow. The casing is formed with an outlet passage 5 that communicates at its inner end with the main chamber at a point intermediate the ends thereof, and that has its outer end terminating immediately adjacent the lower enlarged chamber. The passage 5 is internally threaded at its outer end for receiving a spout piece 4. A cylindrical valve head 7 is arranged in the main chamber and threaded from one end to the other for engaging the internal threads of such chamber and this head is carried by a stem 8 that projects out of the casing and is equipped with an operating handle 9 or equivalent means. The stem 8 passes through a cap nut 10 which screws into the upper enlarged chamber and the top of the valve head is flat so as to seat against the cap when the valve is fully open for preventing leakage around the valve stem. An elbow coupling 11 is screwed into the lower enlarged chamber and the bore of the coupling is smaller than the diameter of the main chamber so that the inner end surface of the coupling serves as a valve seat 12 against which the said valve head is adapted to bear when the faucet is entirely closed. To insure a better fit, a gasket or washer 13 is secured to the valve head to tightly engage the seat 12. With the parts disposed as described and shown, there is no chance for water to be entrapped in the faucet when the service system with which the faucet is connected is cut out of service, since the water will drain out through the passage 5 when the faucet is closed, and out through the coupling 11 when the water is drawn off from the service pipe.

I claim:

In a faucet, the combination of a casing having a main valve chamber of uniform diameter threaded throughout its length, an enlarged chamber at each end of and in line with the main chamber, the enlarged chambers being alike, said casing having an outlet passage intermediate its length and terminating immediately adjacent one of the enlarged chambers, a supply connection joined to the enlarged chamber which is adjacent the outlet and a cap in the other enlarged chamber, a valve stem passing through the cap and carrying a cylindrical valve head threaded throughout its length to engage the casing and having two faces one of which is adapted to seat against the cap.

In testimony whereof, I affix my signature in presence of two witnesses.

OWEN WARNOCK.

Witnesses:
　JAMES F. DUHAMEL,
　HARRY C. HEBIG.